United States Patent [19]

Nychka

[11] 3,899,541
[45] Aug. 12, 1975

[54] PROCESS FOR COUPLING IODOPERHALO COMPOUNDS
[75] Inventor: Henry R. Nychka, East Aurora, N.Y.
[73] Assignee: Allied Chemical Corporation, New York, N.Y.
[22] Filed: Dec. 27, 1971
[21] Appl. No.: 212,821

Related U.S. Application Data
[63] Continuation-in-part of Ser. No. 818,107, April 21, 1969, Pat. No. 3,637,868.

[52] U.S. Cl............ 260/648 F; 260/649 F; 260/653; 260/653.3; 260/651 F
[51] Int. Cl.² .......................................... C07C 17/26
[58] Field of Search............. 260/653, 648 F, 649 F, 260/653.3

[56] References Cited
UNITED STATES PATENTS
3,046,304  7/1962  Haszeldine...................... 260/653.3
3,317,618  5/1967  Haszeldine......................... 260/653
3,637,868  1/1972  Nychka........................... 260/648 F Primary Examiner—Delbert E. Gantz
Assistant Examiner—Joseph A. Boska
Attorney, Agent, or Firm—Jay P. Friedenson

[57] ABSTRACT

This invention relates to a method for coupling various iodoperhalo compounds, particularly iodoperfluoroalkanes, by reaction in the presence of a metal fluoride selected from the group consisting of CsF, RbF, KF and BaF$_2$, at a temperature of at least about 275°C.

16 Claims, No Drawings

PROCESS FOR COUPLING IODOPERHALO COMPOUNDS

CROSS-REFERENCE TO RELATED APPLICATION

This application is a continuation-in-part application of my co-pending, commonly assigned application Ser. No. 818,107, filed Apr. 21, 1969, now U.S. Pat. No. 3,637,868.

BACKGROUND OF THE INVENTION

Halogenated organic compounds are of great industrial importance. In particular, perfluorinated organic compounds are useful as dielectric coolants and heat transfer media because of a combination of favorable electrical and physical properties, chemical inertness and thermal stability. For high thermal stability it is important that the perfluorinated compounds be very pure. No hydrogen containing impurities can be tolerated as they are susceptible to thermal decomposition.

Large molecular size perhalo organic compounds may be prepared by coupling two iodoperhalo organic molecules together, eliminating iodine and forming a molecule larger in size than either of the original molecules. Iodoperhalo organic compounds are currently coupled by any of several different methods. One method involves coupling the iodoperhalo compounds in the presence of zinc in a suitable solvent. See U.S. Pat. No. 3,317,618. This coupling technique, however, gives a considerable amount of olefin and/or reduction products which cause thermal stability problems. U.S. Pat. No. 3,046,304 discloses the application of ultraviolet radiation in the presence of mercury to cause coupling of iodoperhalo compounds. This method while giving high yields of coupled product is expensive and not easily suited to scaling up to industrial quantities.

Accordingly, it is an object of the present invention to provide a method for coupling various iodoperhalo organic compounds which avoids the shortcomings of the prior art methods.

It is another object of the present invention to provide a method for the coupling of various iodoperhalo compounds in the presence of certain hereinafter defined metal fluorides wherein no reaction medium is required and whereby essentially no by-products are formed.

DESCRIPTION OF THE INVENTION

In accordance with this invention, it has been surprisingly found that various iodoperhalo organic compounds can be made to react in the presence of certain hereinafter defined metal fluorides without the use of a solvent and therefore the problems associated with a solvent are eliminated. For example:

1. No hydrogen containing impurities are formed
2. The product is easily isolated from the unreacted starting material.

The invention process entails the coupling of two iodoperhalo organic reactants of the formula

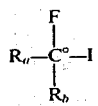

and

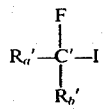

wherein $R_a$, $R_b$, $R_a'$ and $R_b'$ are independently fluorine or a perhalo radical of 1 to 24 carbon atoms, preferably 1 to 16 carbon atoms, selected from the group consisting of perhaloalkyl, perhalocycloalkyl and perhaloalkylene substituted perfluoroaryl, with the provisos that the total number of carbon atoms in each iodoperhalo organic reactant being no more than 37, preferably no more than 21; and wherein the halo portion can be fluorine, chlorine, bromine, iodine or mixtures thereof, with the provisos that both $R_a$ and $R_b$ are not fluorine, both $R_a'$ and $R_b'$ are not fluorine, and iodine atoms are separated from $C^\circ$ and $C'$ and from each other if at least two are present, by at least one non-iodo containing carbon atom, i.e., iodines may not be attached to adjacent carbon atoms and no more than one iodine may be attached to any one carbon atom. The two iodoperhalo organic reactants may be the same or different.

In the above defined $R_a$, $R_b$, $R_a'$ and $R_b'$, the perhalocycloalkyl group may be unsubstituted or substituted with perhaloalkyl substituents, and all carbon chains in the $R_a$, $R_b$, $R_a'$ and $R_b'$ groups may be straight chain or branched.

The preferred iodoperhalo organic compounds are (1) iodoperfluoroalkanes wherein $R_a$ and $R_b$ are independently fluorine or a perfluoroalkyl of 1 to 24 carbon atoms, preferably 1 to 16 carbon atoms; (2) diiodoperfluoroalkanes wherein $R_a$ is an iodoperfluoroalkyl of 1 to 24 carbon atoms, preferably 1 to 16 carbon atoms, and $R_b$ is fluorine or perfluoroalkyl of 1 to 24 carbon atoms, preferably 1 to 16 carbon atoms.

The coupled product has the general formula

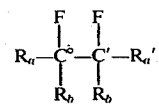

wherein $R_a$, $R_b$, $R_a'$ and $R_b'$ are as defined above and the total number of carbon atoms in the coupled product does not exceed 74, and preferably does not exceed 42.

In the invention process, the hereinabove defined iodoperhalo organic reactants are coupled by reacting them with a metal fluoride selected from the group consisting of CsF, RbF, KF and $BaF_2$, the preferred metal fluorides being CsF and RbF.

No reaction medium is required for the process, which takes place in either the vapor or the liquid phase depending upon the reaction temperature employed and the boiling point of the particular iodoperhalo compound being coupled. Reaction temperature is at least about 275°C. preferably from about 300°C. to about 450°C., and most preferably from about 325°C. to about 400°C. Reaction time is not critical to the invention process, however, to obtain optimum yields a reaction time of about at least 4 hours is preferred, most preferably about 8 hours to about 20 hours. The reaction may be run at atmospheric or at sub- or superatmospheric pressures.

The ratio of metal fluoride to iodoperhalo reactant is not critical as some coupling will always occur as long as there is some amount of metal fluoride present and the temperature of the reaction mixture is within the above stated range. However, to obtain optimum yields a stoichiometric amount of metal fluoride should be present in the reaction mixture, i.e., one mole of metal fluoride for every two moles of iodoperhalo reactant. Most preferred is a mole ratio of metal fluoride to iodoperhalo reactant of from about 0.5:1 to about 3:1.

The reaction product consists essentially of coupled product, unreacted starting material and a metal fluoride-iodide complex. The coupled product can readily be recovered by any of the conventional methods known to those skilled in the art. For example, because of the wide difference in their boiling points, the coupled product and the starting material can be readily separated by fractional distillation.

Illustrative of iodoperhalo organic compounds suitable for use as reactants in the invention process are the following:

$CF_3(CF_2)_{15}CF_2I$ $CF_3(CF_2CFCl)_{23}CF_2I$

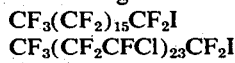

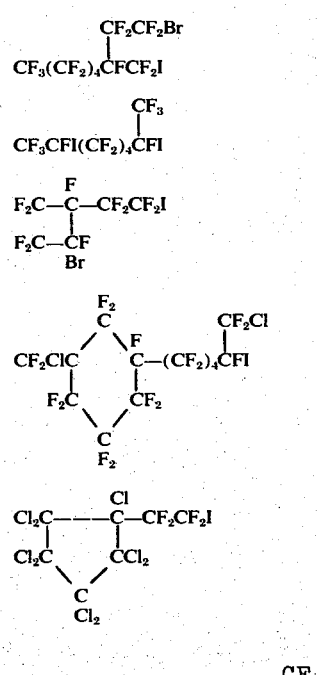

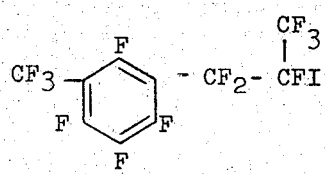

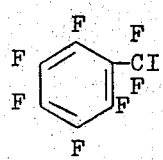

The iodoperhalo compounds which are suitable for use as reactants in the process of this invention are all well known classes of compounds; many of which are commercially available, and all of which can be readily prepared by conventional methods known to those skilled in the art.

The compounds produced by the invention process possess excellent chemical and thermal stability. They are thus useful as inert reaction media for carrying out chemical reactions, as hydraulic fluids, as lubricants, and as heat transfer agents. They are especially useful as dielectric liquid and/or vapor phase coolants and heat transfer media for use in electrical and electronic equipment, and as chemically and thermally stable fluids useful in withstanding environmental conditions of extremes of both high and low temperatures.

The invention can be more fully understood by reference to the following examples.

EXAMPLE 1

Samples of i—$C_3F_7I$ (40.0 g., .135 mole), boiling point 40°C. and CsF (40.0 g., 0.26 mole) were combined in an evacuated 75 ml. stainless steel ampoule which was then heated in an oven (without shaking) for 14 hours at 350°C. After cooling, there were obtained 18.7 g. of the coupled product, perfluoro-2,3-dimethylbutane, in 96% chromatographic purity. This represented a 79% yield. A spinning band distillation of the product gave an overhead material of boiling point 59°–60°C. (Literature value 60.0°C.) Fluorine nmr analysis of the distilled product confirmed the assigned structure.

EXAMPLE 2

A mixture of n—$C_3F_7I$ (2.0 g., .007 mole), boiling point 41°C and CsF (2.1 g., .014 mole) was sealed under vacuum in a heavy wall Pyrex tube and heated at 350°C for 16 hours. Gas chromatographic analysis of the recovered material showed that it contained 95% of the coupled product, n—$C_6F_{14}$. This represented almost a quantitative yield. Identity of product was confirmed by infrared analysis.

EXAMPLE 3

A mixture of $C_2F_5I$ (0.9 g., .004 mole), boiling point 13°C., and CsF (1.0 g., .007 mole) was reacted as described in Example 2. Again, essentially a quantitative yield of coupled product, n—$C_4F_{10}$, was obtained. Identity of product was confirmed by infrared analysis.

EXAMPLE 4

A mixture of n—$C_7F_{15}I$ (2.0 g., .005 mole) boiling point 137°C., and CsF (1.2 g., .008 mole) was reacted as described in Example 2. The recovered material was a wax-like product having a melting point of 99°C. This agreed with the reported literature value of 99–101 for the compound n—$C_{14}F_{30}$.

EXAMPLE 5

A mixture of $CF_2ICF_2CF_2I$ (5.0 g., .012 mole) boiling point 68°/98 mm Hg, and CsF (1.92 g., .012 mole) in a 20 ml. Pyrex tube was heated at 350°C. for 18 hours. After the reaction period, the tube was cooled to room temperature and 0.36 g. of volatile products was released from the tube. The solid remaining was washed consecutively with a dilute $Na_2SO_3$ solution and water and then dried. A white waxy polymeric solid product equal to 1.3 g. was obtained.

EXAMPLES 6–10

Following the procedure of Example 1, the iodoperhalo organic compound mixtures shown in the following table are reacted to give the indicated products.

| EXAMPLE | REACTANT | PRODUCT |
|---|---|---|
| 6 | 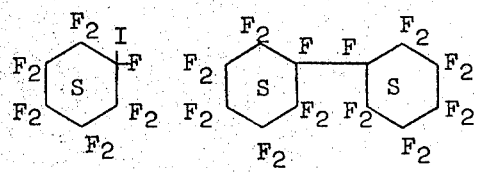 | |
| 7 | 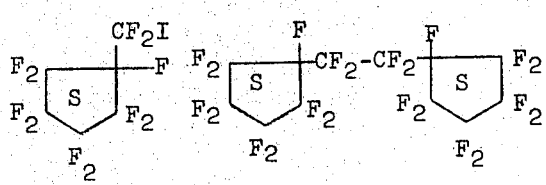 | |
| 8 | 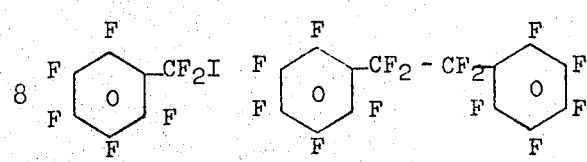 | |

| EXAMPLE | REACTANT | PRODUCT |
|---|---|---|
| 9 | $CF_2ClCF_2CF_2I$ <br> + <br> $CF_3CFBrCF_2CF_2I$ | $CF_2ClCF_2CF_2CF_2CF_2CFBrCF_3$ |
| 10 | $CF_3(CF_2)_{36}I$ | $CF_3(CF_2)_{72}CF_3$ |

I claim:
1. The method which comprises coupling two iodoperhalo organic reactants of the formula

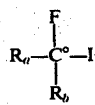

and

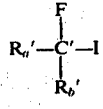

wherein $R_a$, $R_b$, $R_a'$ and $R_b'$ are independently fluorine or a perhalo radical of 1 to 24 carbon atoms selected from the group consisting of perhaloalkyl, perhalocycloalkyl and perhaloalkylene substituted perfluoroaryl, with the provisos that the total number of carbon atoms in each iodoperhalo organic reactant being no more than 37, both $R_a$ and $R_b$ are not fluorine, both $R_a'$ and $R_b'$ are not fluorine, and iodine atoms are separated from $C°$ and $C'$ and from each other, if at least two are present, by at least one non-iodo containing carbon atom, by reacting said iodoperhalo organic reactants with a metal fluoride selected from the group consisting of CsF, RbF, KF and BaF$_2$, at a temperature of at least about 275°C.

2. The method of claim 1, wherein the metal fluoride is CsF or RbF.

3. The method of claim 2, wherein the reaction temperature is from about 300°C. to about 450°C.

4. The method of claim 2, wherein the reaction temperature is from about 325°C to about 400°C.

5. The method of claim 1, wherein $R_a$, $R_b$, $R_a'$ and $R_b'$ are independently fluorine or a perhalo organic radical of 1 to 16 carbon atoms, with the proviso that the total number of carbon atoms in the coupled product does not exceed 42.

6. The method of claim 5, wherein the metal fluoride is CsF or RbF and the reaction temperature is from about 300°C. to about 450°C.

7. The method of claim 6, wherein the reaction temperature is from about 325°C. to about 400°C.

8. The method of claim 1, wherein the iodoperhalo organic reactants are iodoperfluoroalkanes, $R_a$, $R_b$, $R_a'$ and $R_b'$ being independently fluroine or perfluoroalkyl.

9. The method of claim 8, wherein the perfluoroalkyl has 1 to 16 carbon atoms, the total number of carbon atmos in the coupled product does not exceed 42, the metal fluoride is CsF or RbF, and the reaction temperature is from about 300°C. to about 450°C.

10. The method of claim 9, wherein the reaction temperature is from about 325°C. to about 400°C.

11. The method of claim 10 wherein the total number of carbon atmos in the coupled product does not exceed 14.

12. The method of claim 11, wherein the iodoperfluoro alkanes are $CF_3(CF_2)_5CF_2I$.

13. The method of claim 1, wherein at least one of the iodoperhalo reactants is diiodoperfluoroalkane, $R_a$ being iodoperfluoroalkyl and $R_b$ being fluorine or perfluoroalkyl.

14. The method of claim 13, wherein said iodoperfluoroalkyl and said perfluoroalkyl each have 1 to 16 carbon atoms, the total number of carbon atoms in the coupled product does not exceed 42, the metal fluoride is CsF or RbF, and the reaction temperature is from about 300°C. to about 450°C.

15. The method of claim 14, wherein the reaction temperature is from about 325°C. to about 400°C.

16. The method of claim 15, wherein the diiodoperfluoroalkane is $CF_2ICF_2CF_2I$.

* * * * *